United States Patent
Marvin et al.

(10) Patent No.: US 10,312,760 B2
(45) Date of Patent: Jun. 4, 2019

(54) LIQUID COOLED HIGH EFFICIENCY PERMANENT MAGNET MACHINE WITH IN SLOT GLYCOL COOLING

(75) Inventors: Russel Hugh Marvin, Goshen, CT (US); Thomas R. Johnson, Guilford, CT (US)

(73) Assignee: LCDRIVES CORP., Goshen, CT (US)

( * ) Notice: Subject to any disclaimer, the term of this patent is extended or adjusted under 35 U.S.C. 154(b) by 0 days.

(21) Appl. No.: 13/548,203

(22) Filed: Jul. 13, 2012

(65) Prior Publication Data

US 2014/0015347 A1 Jan. 16, 2014

(51) Int. Cl.
| | |
|---|---|
| *H02K 3/24* | (2006.01) |
| *H02K 9/19* | (2006.01) |
| *H02K 3/30* | (2006.01) |
| *H02K 9/22* | (2006.01) |

(52) U.S. Cl.
CPC .............. *H02K 3/24* (2013.01); *H02K 3/30* (2013.01); *H02K 9/19* (2013.01); *H02K 9/22* (2013.01)

(58) Field of Classification Search
CPC ............ H02K 9/16; H02K 9/19; H02K 9/193; H02K 9/197; H02K 9/22; H02K 3/24; H02K 3/30
USPC ........ 310/52, 54, 58, 59, 60 A, 60 R, 64, 43
See application file for complete search history.

(56) References Cited

U.S. PATENT DOCUMENTS

| | | | | |
|---|---|---|---|---|
| 1,853,646 A * | 4/1932 | Von Kando | ............. | H02K 9/19 310/54 |
| 3,261,995 A * | 7/1966 | Kohn | ............................ | 310/64 |
| 3,531,668 A * | 9/1970 | Cathey | ............................ | 310/58 |
| 4,574,112 A * | 3/1986 | Breault | ................. | F28D 7/0041 429/120 |
| 5,189,325 A * | 2/1993 | Jarczynski | ............... | H02K 9/19 310/54 |
| 5,497,615 A * | 3/1996 | Noe et al. | .................. | 60/39.511 |
| 5,871,588 A * | 2/1999 | Moslehi et al. | ............. | 118/730 |
| 6,313,556 B1 | 11/2001 | Dombrovski et al. | | |
| 6,762,520 B1 * | 7/2004 | Ehrhart et al. | .................. | 310/86 |
| 7,545,060 B2 * | 6/2009 | Ward | ............................... | 310/54 |
| 7,659,651 B2 * | 2/2010 | Obata et al. | .................. | 310/180 |
| 2003/0193256 A1 * | 10/2003 | Liebermann | ............ | H02K 9/22 310/194 |
| 2005/0035673 A1 * | 2/2005 | Lafontaine et al. | ............ | 310/58 |
| 2006/0125332 A1 * | 6/2006 | Tolle et al. | ...................... | 310/54 |

(Continued)

FOREIGN PATENT DOCUMENTS

| | | |
|---|---|---|
| EP | 0 519 091 A1 | 12/1992 |
| EP | 1 727 263 A2 | 11/2006 |

(Continued)

OTHER PUBLICATIONS

Kohring (EP 2 463 991) Jun. 13, 2012 English Translation.*

(Continued)

*Primary Examiner* — Thomas Truong
*Assistant Examiner* — Robert E Mates
(74) *Attorney, Agent, or Firm* — Tarolli, Sundheim, Covell & Tummino LLP

(57) ABSTRACT

A permanent magnet motor, generator or the like that is liquid cooled using glycol or similar fluid with the means defining cooling passageways disposed directly in the winding slots of the stator between and in engagement with the windings and stator laminations.

32 Claims, 13 Drawing Sheets

(56) References Cited

U.S. PATENT DOCUMENTS

| | | | | |
|---|---|---|---|---|
| 2007/0176499 | A1* | 8/2007 | Holmes | H02K 9/19 |
| | | | | 310/54 |
| 2008/0197724 | A1* | 8/2008 | Cullen et al. | 310/53 |
| 2009/0167101 | A1* | 7/2009 | Saga et al. | 310/45 |
| 2009/0261668 | A1* | 10/2009 | Mantere | H02K 5/20 |
| | | | | 310/54 |
| 2009/0294574 | A1* | 12/2009 | Hilgemann | F41G 7/226 |
| | | | | 244/3.1 |
| 2010/0117461 | A1* | 5/2010 | Eastham | 310/13 |
| 2010/0230080 | A1* | 9/2010 | Iwasaki | 165/173 |
| 2011/0048582 | A1* | 3/2011 | Sawada et al. | 148/24 |
| 2011/0133580 | A1* | 6/2011 | Sugimoto | H02K 1/20 |
| | | | | 310/54 |
| 2011/0241458 | A1* | 10/2011 | Rai et al. | 310/53 |
| 2012/0087092 | A1* | 4/2012 | Huber | F28D 15/00 |
| | | | | 361/701 |

FOREIGN PATENT DOCUMENTS

| | | | | |
|---|---|---|---|---|
| EP | 2463991 | * | 6/2012 | |
| GB | 974730 A | * | 11/1964 | H02K 3/24 |
| JP | 01136540 A | * | 5/1989 | |
| JP | 2004208461 A | * | 7/2004 | |
| JP | 2009240113 A | * | 10/2009 | |
| WO | 2012035044 | * | 3/2012 | |

OTHER PUBLICATIONS

Fukushima (JP 2009240113 A) English Translation.*
Tsuneyoshi et al. (JP 2004208461 A) English Translation.*
Yamaguchi (JP 01136540 A) English Translation.*
PCT/US2013/049503 Written Opinion of the International Searching Authority, completed Dec. 6, 2013.
EP 13 81 7058 Supplementary European Search Report, Completed Jun. 30, 2016.

* cited by examiner

LIQUID COOLED HIGH EFFICIENCY PERMANENT MAGNET MACHINE WITH IN SLOT GLYCOL COOLING

BACKGROUND OF THE INVENTION

Rotary electric machines including electric motors, generators, and the like have employed various cooling methods including air cooling and liquid cooling. Liquid cooling is used to help make motors smaller and to remove the heat more efficiently.

The most common liquid cooling design uses a cooling jacket wrapped around the outside of the stator assembly. This can be seen in U.S. Pat. No. 5,448,118, included herein by reference. In this design there is an aluminum extrusion that surrounds the outside of the stator and has passages for cooling fluid to pass through. This design cools the stator better than air, but is limited by i) the conductivity between the jacket and the stator, ii) the poor conductivity of the stator laminations, iii) the conductivity of the slot liners, and iv) the poor conductivity between the winding and the slot liners.

Another method that is commonly used is passing cooling through the stator laminations or into slots cut into the stator laminations. Either of these has similar disadvantages to the cooling jacket design.

Further, some techniques involve spraying fluid directly on the stator or submerging the stator. These have the disadvantage of either being complex or having the fluid cause drag between the rotor and the stator.

There are a couple of techniques to place the cooling jacket through the winding slot. One of these is forcing fluid down the center of a conductor. Typically the fluid in this case is a non-conductive oil. This has the disadvantage of requiring a special fluid and some complex manufacturing methods to provide the fluid channel. Other techniques place a pipe or vessel down through the slot with cooling fluid in it. These typically also use non-conductive oil and have non-conductive connections to a manifold at their end. An example of this can be found in U.S. Pat. No. 3,112,415, incorporated herein by reference.

Rotary electric machines including electric motors, generators, and the like have also employed various types of stator windings.

The most common stator winding type is an integer-slot winding wherein the number of slots per pole per phase is an integer. An example of this is a 4 pole 12 slot, 3 phase motor. The number of slots per pole per phase is 1 and therefore an integer. These windings typically require some relatively complex end turns to wire them properly.

Another type of winding is a fractional-slot winding. When the number of slots per pole per phase is a fraction greater than one, this is called a fractional-slot winding. This also has complicated end turns and has the disadvantage of being less efficient. It is sometimes used to smooth out torque ripple or for other specific applications.

The third type of winding is a concentrated winding when the number of slots per pole per phase is a fraction less than one. These can also be called non-overlapping concentrated windings. They have the disadvantage of decreasing the inherent efficiency of the device, but make the end turns very simple and can facilitate other advantages. An example of a concentrated winding would be an 8 pole, 9 slot, 3 phase machine. The number of slots per pole per phase is 0.375 in this case. The fundamental power from this configuration is reduced by 5.5%. Concentrated windings can be single layer or double layer designs. Single layer designs have windings that are wound only on alternating stator teeth and only apply where there is an even number of stator slots/teeth. Double layer designs have coils wound on every stator tooth. In this configuration, there is a coil that surrounds each of the teeth on the stator and there is the same number of coils as slots. In this configuration, each slot has half of one coil and half of another coil going through the slot and the end turns are very short. Ideally, the end turns can be as short as the width of the stator tooth.

Rotary electric machines including electric motors, generators, and the like have also employed various methods of constructing stator windings.

One common method is random winding. This method can use rectangular or round wire, but typically uses round wire. Here the windings are placed by the winding machine with the only requirement that they be located in the correct slot. This is the easiest method of stator winding, but results in the lowest amount of conductor in the slot and therefore the lowest efficiency.

Another common method is traditional form winding. This method typically uses rectangular wire with mica tape located between conductors to separate any conductors that are significantly different in voltage. This insures a robust winding for higher voltage machines or machines that are prone to partial discharge. This is the most labor-intensive type of winding and is typically used in machines that are less cost sensitive.

One winding type that is not typical in motors, is used in certain types of transformers, chokes, and inductors is bobbin layer winding. This type of winding places conductors in exact locations for very accurate stacking of wires. This can achieve a high amount of conductors in a small area for high efficiency. This is not typically used for stator windings because it is not typical to be able to bobbin wind a coil and then insert it into a stator assembly. In the few cases where it is used with a conventional stator, the insertion of the coil into the stator will jumble the wires to render it similar to a random wound coil.

SUMMARY OF THE INVENTION

The machine described herein incorporates several novel construction methods in its stator. It uses in slot liquid cooling with a configuration that allows the use of conductive fluid such as ethylene glycol. This configuration places the cooling component between the winding and the stator laminations to give ideal cooling for the winding as well as the stator laminations. Further this design uses metallic vessels that contain the liquid cooling medium for high reliability. These metallic vessels are brazed together into manifolds to efficiently direct the liquid to where the heat is generated.

The winding is a Layer Form Winding, which combines the advantages of traditional form winding with a manufacturing method that is much lower cost. This technique exactly places conductors in specific locations and insures that no conductors with significant potential differences are located next to each other. This is accomplished with multiple parallel smaller conductors that are arranged carefully.

This design is ideally suited to concentrated winding designs where each coil surrounds a single stator tooth. In this case the coil is divided into two coils—and inner and an outer. The inner coil is bobbin wound and slides on. The outer coil is bobbin wound and then stretched on.

The combination of these approaches leads to a very reliable, small, efficient, and low cost design.

DESCRIPTION OF PREFERRED EMBODIMENT

Figure 1:
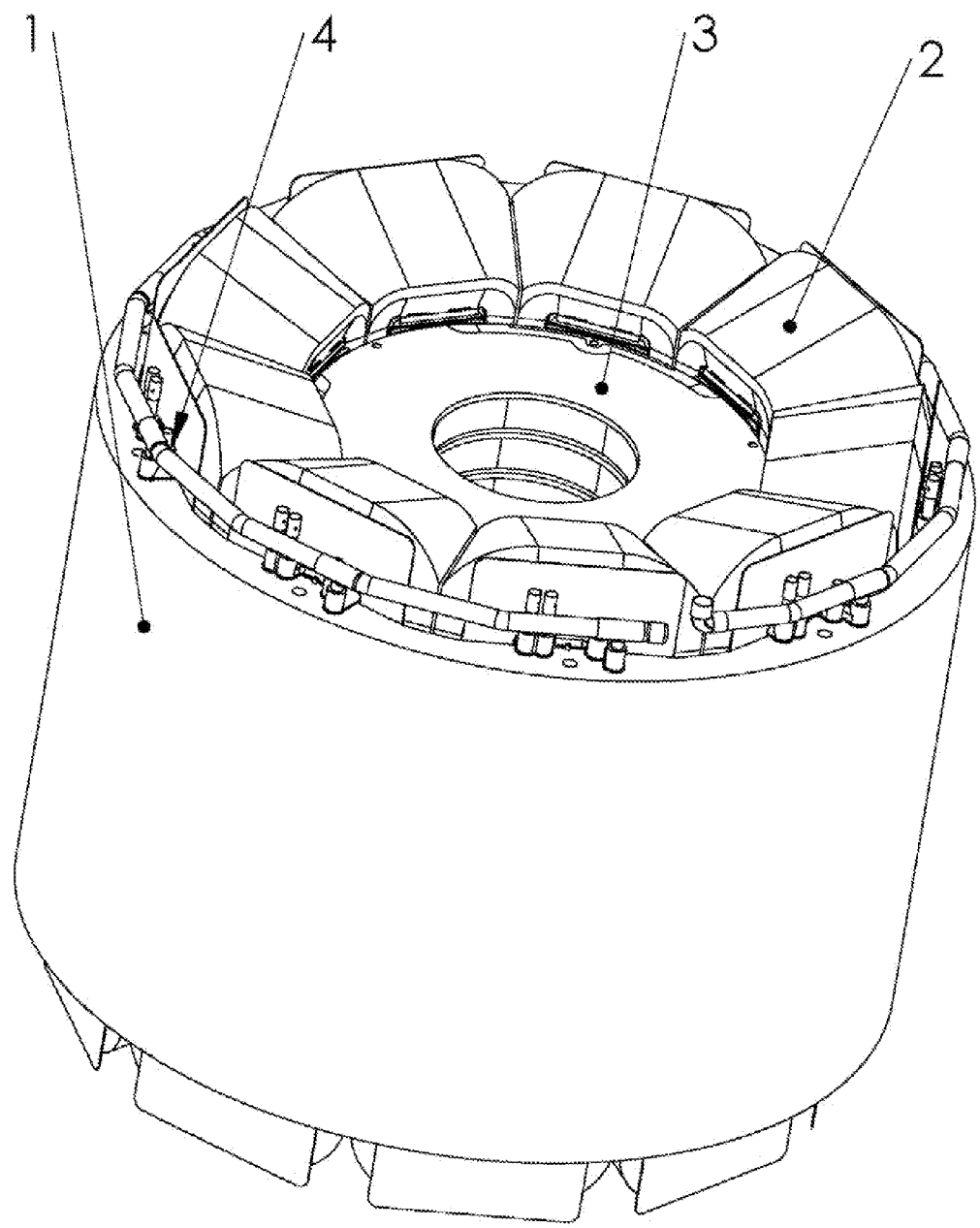
FIG. 1 is a three dimensional view of the stator and rotor assemblies.

Referring particularly to FIG. 1, a rotor 3 is shown surrounded by a stator lamination 1 and stator coils 2. Also shown is a fluid manifold 4 for supplying coolant to the motor or generator.

Figure 2:
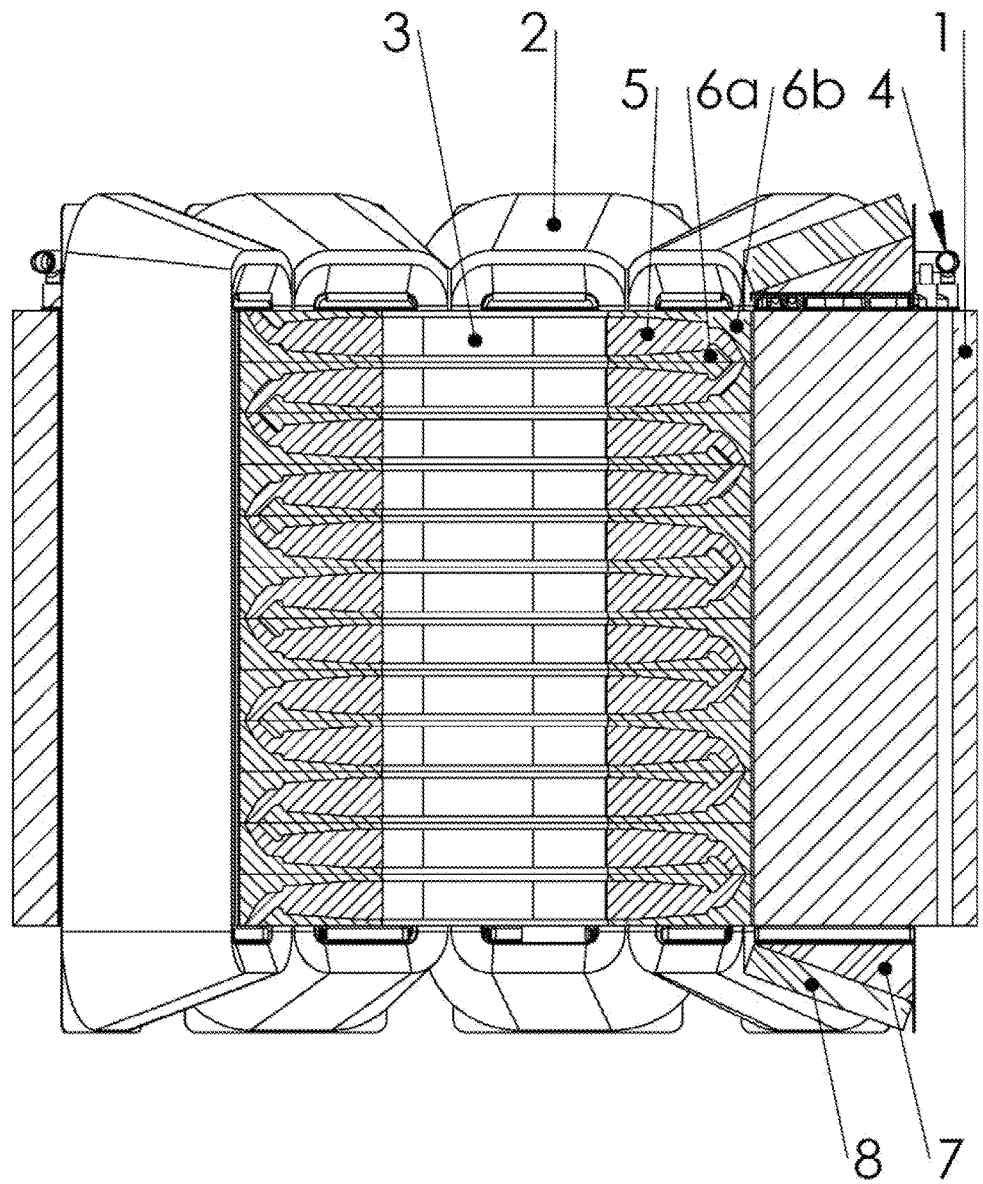
FIG. 2 is a cross sectional view of the stator and rotor assemblies of FIG. 1.

FIG. 2 shows more detail on the rotor configuration showing magnets 5 and tab pole plates 6a and 6b. This rotor configuration is the same as shown in the two patent application Ser. No. 13/438,792 and Ser. No. 13/438,803 filed on Apr. 3, 2012, and each incorporated herein by reference.

Figure 3:
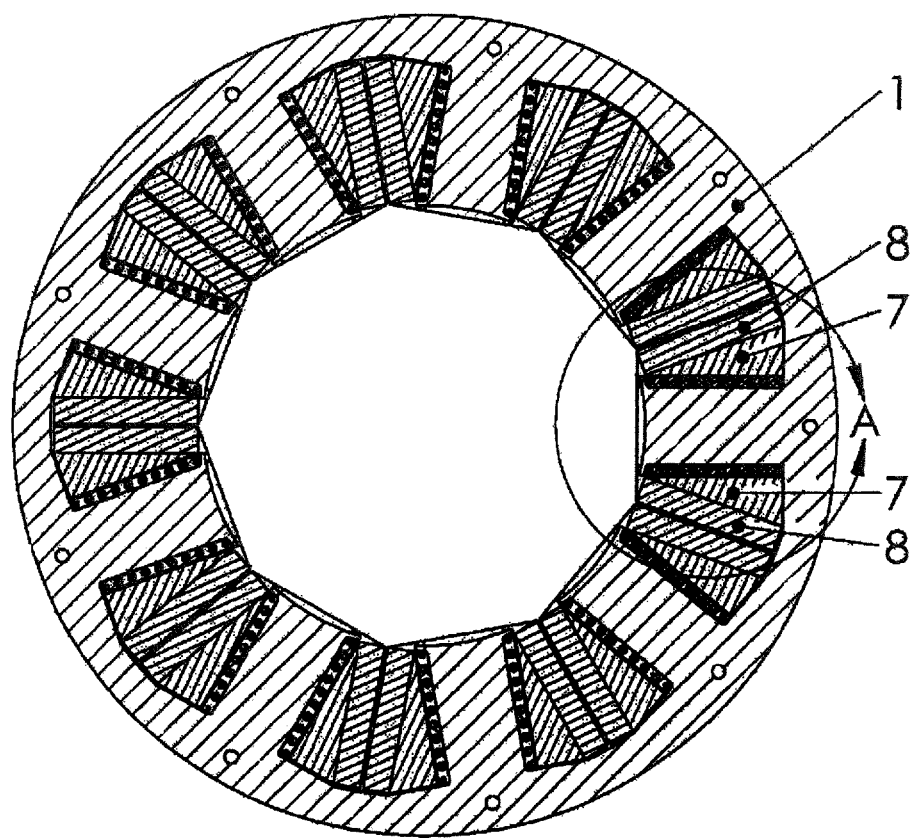
FIG. 3 is cross sectional view of the stator assembly.
Figure 4:
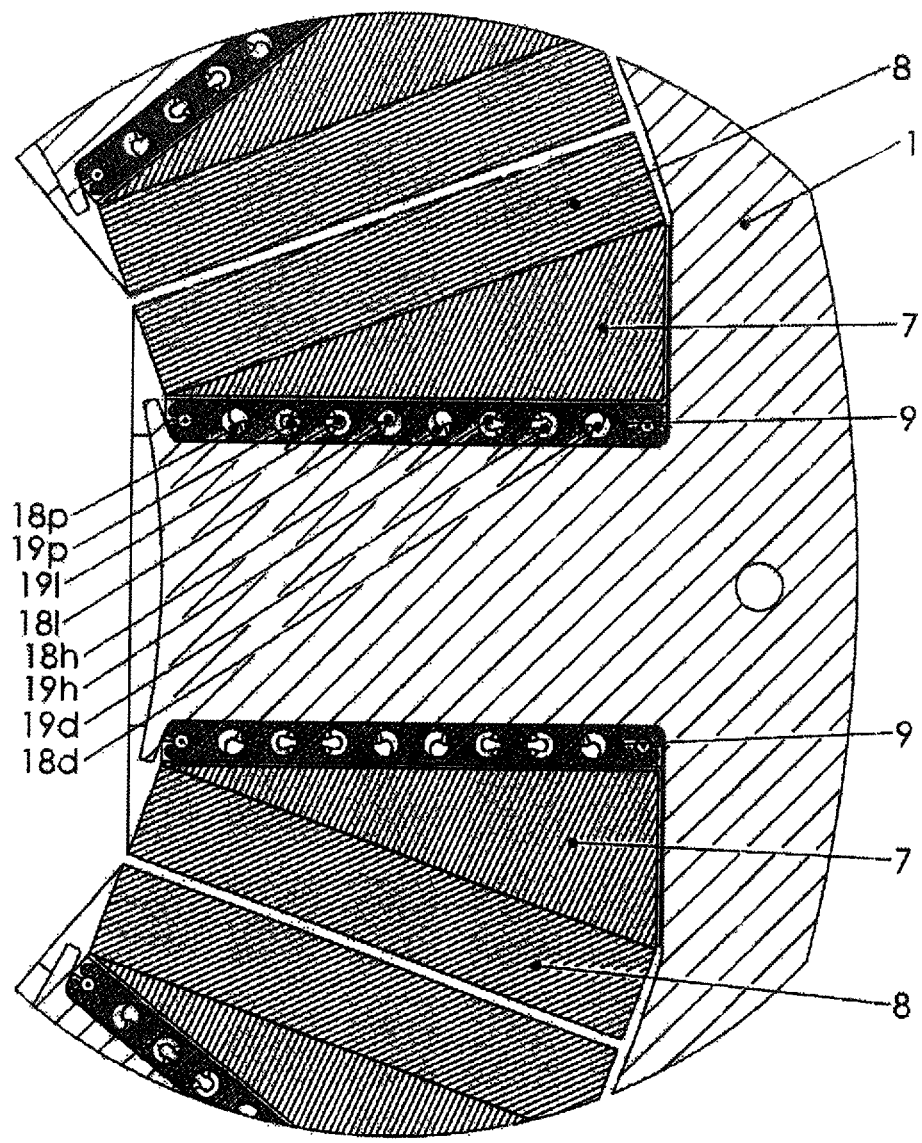
FIG. 4 is a detail view of the stator assembly shown in FIG. 3.
Figure 5:
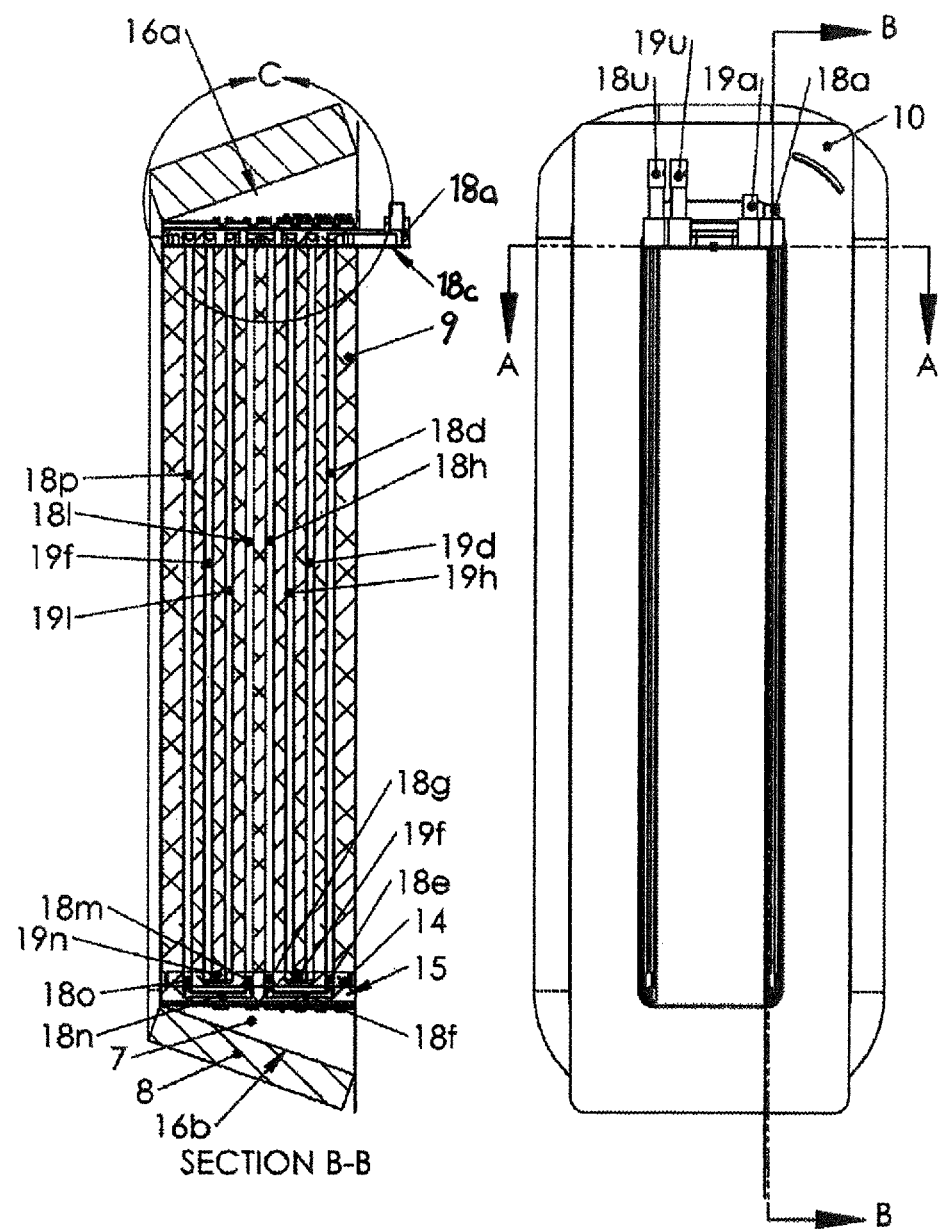
FIG. 5 is a cross sectional and plan view of an individual coil and manifold assembly.
Figure 6:
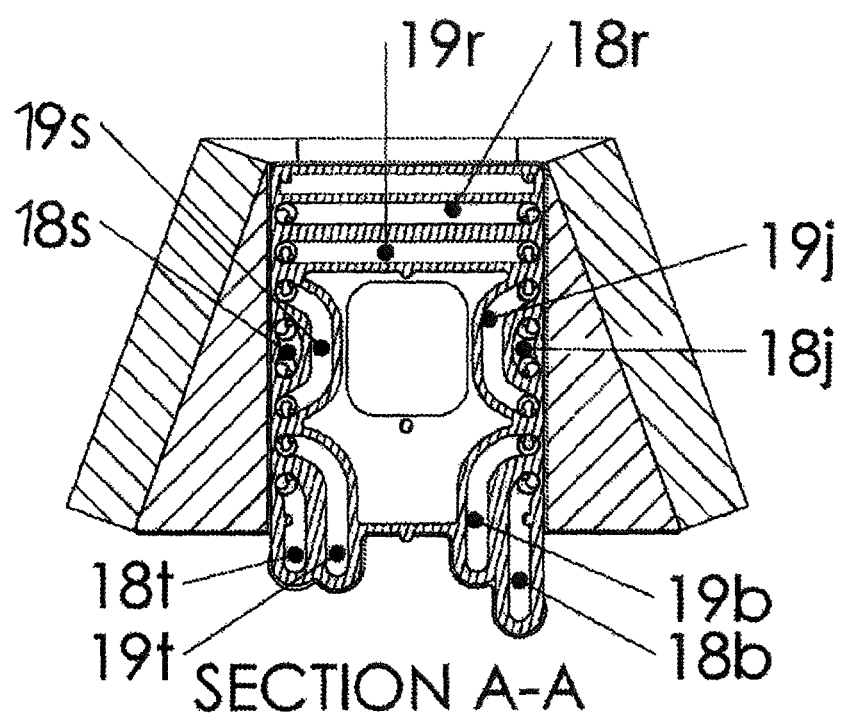
FIG. 6 is a cross sectional view of an individual coil and manifold assembly identified as section A-A in FIG. 5.

The stator shown in FIG. 3 has a double layer concentrated winding since there is a winding around every stator tooth. In addition, the stator winding has an inner portion 7 and an outer portion 8 as shown in FIG. 3 and FIG. 4. The inner and outer portions are separate and distinct from this being a double layer winding which refers to there being a winding around every stator tooth.

Each winding surrounds a cooling vessel 9 as shown in FIG. 4. There are 2 redundant coolant loops denoted as 18 and 19 shown in FIG. 4, FIG. 5, FIG. 6, and FIG. 7. These coolant loops can be connected to their own pump and designed such that only one loop is necessary to keep the machine cool. This can increase the reliability of the system significantly. The same principle can be applied with more than 2 coolant loops where not all of the loops are required to keep machine cool. Coolant enters at tube 18a and travels through cast aluminum manifold section 18b then through aluminum plate 18c and into aluminum extrusion channel 18d. From here the fluid flows through hole 18e in lower cast aluminum manifold 14 and then to passage 18f in lower cast aluminum manifold cap 15 and back to hole 18g in lower cast aluminum manifold. From here it passes up through passage 18h in the aluminum extrusion, through hole 18i in aluminum plate, through passage 18j in aluminum manifold section and back through hole 18k in aluminum plate. Again it passes through 18l in aluminum extrusion, through hole 18m in lower cast aluminum manifold 14, through passage 18n in lower cast aluminum manifold cap 15, and back through hole 18o on lower cast aluminum manifold. From here it passes through 18p in aluminum extrusion, through hole 18q in aluminum plate, and into passage 18r in aluminum manifold. From here the full detailed path is a mirror image of what has just happened, but in general the fluid passes through the extrusion and back to manifold 18s, through extrusion, and back to manifold 18t to then exit through tube 18u. Passage 19 follows a similar path going from 19a, 19b, 19c, 19d, 19e, 19f, 19g, 19h, 19i, 19j, 19k, 19l, 19m, 19n, 19o, 19p, 19q, 19r, 19s, 19t, and 19u.

This flow path is desirable since there are no loops around stator teeth that are formed with the coolant. This is important because it allows the use of conductive fluids such as a water and ethylene glycol mixture without sacrificing any performance. Further, it allows the use of metals to hold cooling fluid with brazed or soldered joints without causing any shorting paths. While using soldering or brazing, a preferable method of adding filler material is either by using stamped foils inserted between components or by applying paste on one of the surfaces.

Having a soldered or brazed joint is important for the overall reliability of the system and is preferable to O-rings, hoses or other insulation systems.

Fluid can pass through this passage in either direction but preferably is in a cross flow configuration. These can be manifolded from a single end and can be connected in parallel or in series. A parallel configuration is the preferred method due to reduced fluid pressure drop with smaller passages.

Using conductive materials such as aluminum right next to stator laminations does have some engineering challenges. The gap between stator lamination 1 and cooling vessels 9 as shown in FIG. 4 is critical. There are stray magnetic fields that are slightly outside of the stator laminations that can cause eddy currents if there is conductive material very close. This can be mitigated by allowing a small gap between these components. The size of the gap is a function of how high the flux density is in the adjacent stator laminations. If the gap needs to be large enough such that the thermal conductivity of the VPI fluid is not sufficient, a thermally conductive layer can be added to enhance heat flow. This layer needs to have some electrical resistivity so as not to generate eddy currents, but does not need to be a true insulator as normally used for slot liners. If used, this layer should have a thermal conductivity of at least 1 W/mK and preferably 10 W/mK. Its electrical resistivity should be at least 100 Ohm cm and preferably 10,000 Ohm cm.

Figure 8:
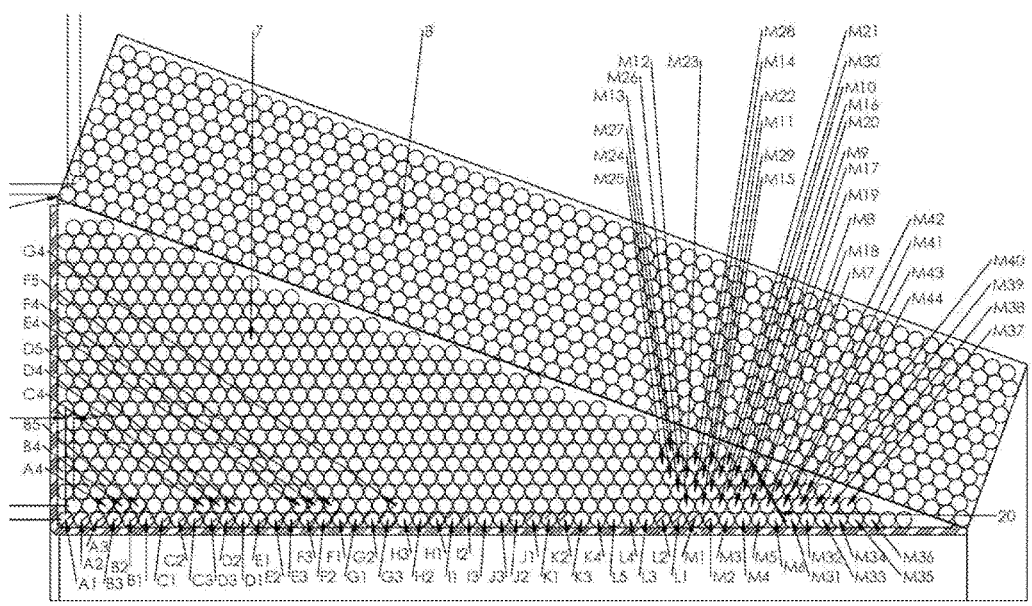
FIG. 8 shows a cross sectional view of the inner and outer windings.

The winding is preferably made with round wire as shown in the cross sectional view FIG. 8. The winding is a close packed configuration where each wire is individually placed for optimum packing density and thermal conductivity. Inner winding 7 and the outer winding 8 are placed in parallel. Additionally all of the coils of a given phase are connected in parallel. This allows the use of the minimum size wire for easier coil manufacturing. FIG. 8 shows an inner winding 7 with thirteen parallel windings denoted A, B, C, D, E, F, G, H, I, J, K, L, and M. This inner winding shown has 44 turns for each of the thirteen in hand windings. These turns are denoted as the number after each letter i.e. A1 is turn 1 on winding and B4 is turn 4 on winding B. It is an object of this winding design to arrange the turns so that there is not a high voltage difference between adjacent wires. Since all the turns are connected in parallel this means that you don't want wires with significantly different numbers next to each other. Ideally it is good to make it so that there is less a difference of at least one quarter the total number of winds so that the voltage difference is one quarter of the motor voltage at a maximum. A triangular cross section of the inner winding 7 as shown in FIG. 8 is a preferred shape to allow installation of the windings. An alternate shape would be a truncated triangle or quadrilateral. With a triangular cross section of the inner winding 7 as shown in FIG. 8 it is particularly tricky to arrange the wires near the point of the triangle. This wire M is shown with all 44 winds. In this case it was not possible to have a small voltage difference between M6 and M31 or between M7 and M42 for instance. These cases have differences of 25 and 35 respectively and are much greater than the desired 11 since 11 is one quarter of the number of turns. For this reason a piece of mica tape 20 is added to separate these conductors. The outer winding 8 as shown in FIG. 8 is wound in a similar configuration with multiple wires in hand.

Figure 12:
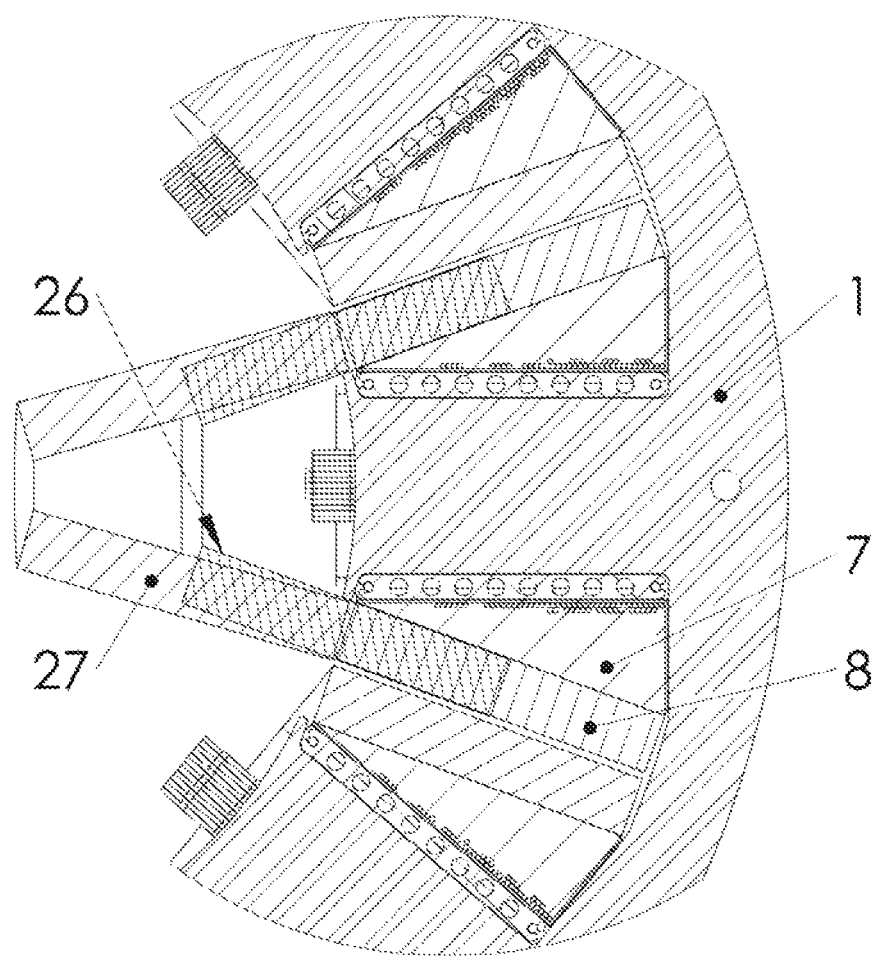
FIG. 12 shows a cross section view of stator assembly with an outer coil inserted.
Figure 13:
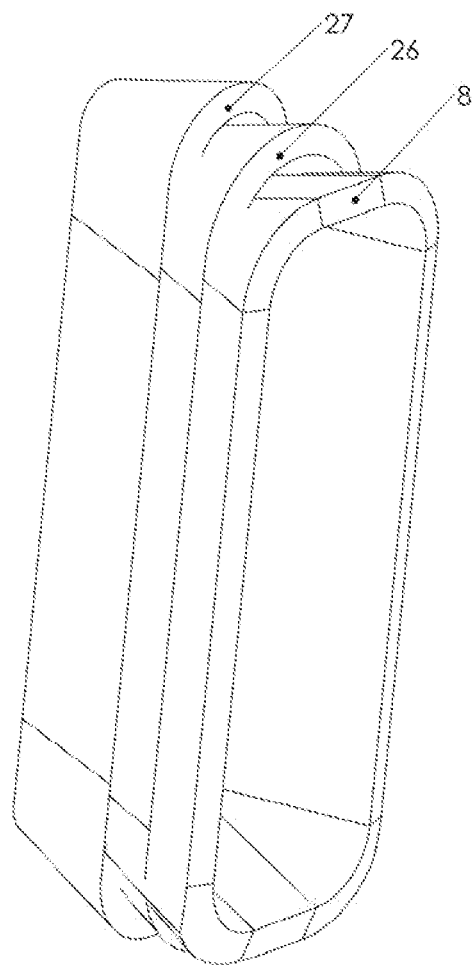
FIG. 13 shows the outer coil shapes as they are being inserted.

The inner winding 7 as shown in FIG. 3 and FIG. 4 is designed to be installed by sliding over the tooth. The triangular shape allows installation of all of the coils without deformation so these can be bobbin wound and slid on easily. The outer winding 8 as shown in FIG. 3 and FIG. 4 is installed after all the inner windings are installed. The winding insertion shape is shown in FIG. 12 and FIG. 13. To accomplish this, the outer winding is flattened to shape 27 as shown after winding and then stretched back into shape while inserting the winding into the slot, first to shape 26 and then finally to shape 8 as shown in FIG. 12 and FIG. 13. Alternatively, the winding can be wound in that distorted shape to save the flattening step. After the outer windings are installed a wedge block can be inserted in between each pair of outer windings to force the inner and outer windings into close contact. Due to the uneven nature of these windings, it is preferable to place a wicking material between them so that retention of VPI fluid is insured in the final assembly. The location of this wicking is the entire surface between the inner and outer coil and is shown by 16a, 16b in FIG. 5.

It is preferable for the outer winding to be wound around a removable mandrel rather than a bobbin to accommodate the defamation of the coil during insertion. Further, without a bobbin, it may be necessary to use adhesive to secure the wires in location between the time it is wound and the time it is inserted into the stator. It is important to apply the adhesive only in areas of the coil that do not slide during the deformation process.

The winding process is critical to get a properly formed coil for assembly into this machine. One critical parameter of the winding process is to get proper tension on the wire while winding, preferably by having individual control of the tension on each wire. Further, since a winding machine for this type of winding must have multiple spools of wire it is important to be able to determine when to change each spool of wire on an individual basis. A preferable way of doing this is by weighing the spool of wire continuously on the winding machine. To accommodate this method it is important to use a circular spool of wire rather than a pail of wire to get accurate readings from the scale.

Assembly order of the windings is important. It is preferable to install all the inner windings before the outer windings are installed. While this is not critical, it is critical to have all the inner windings installed before the last two outer windings are installed to accommodate installation of all the inner windings.

Figure 7:
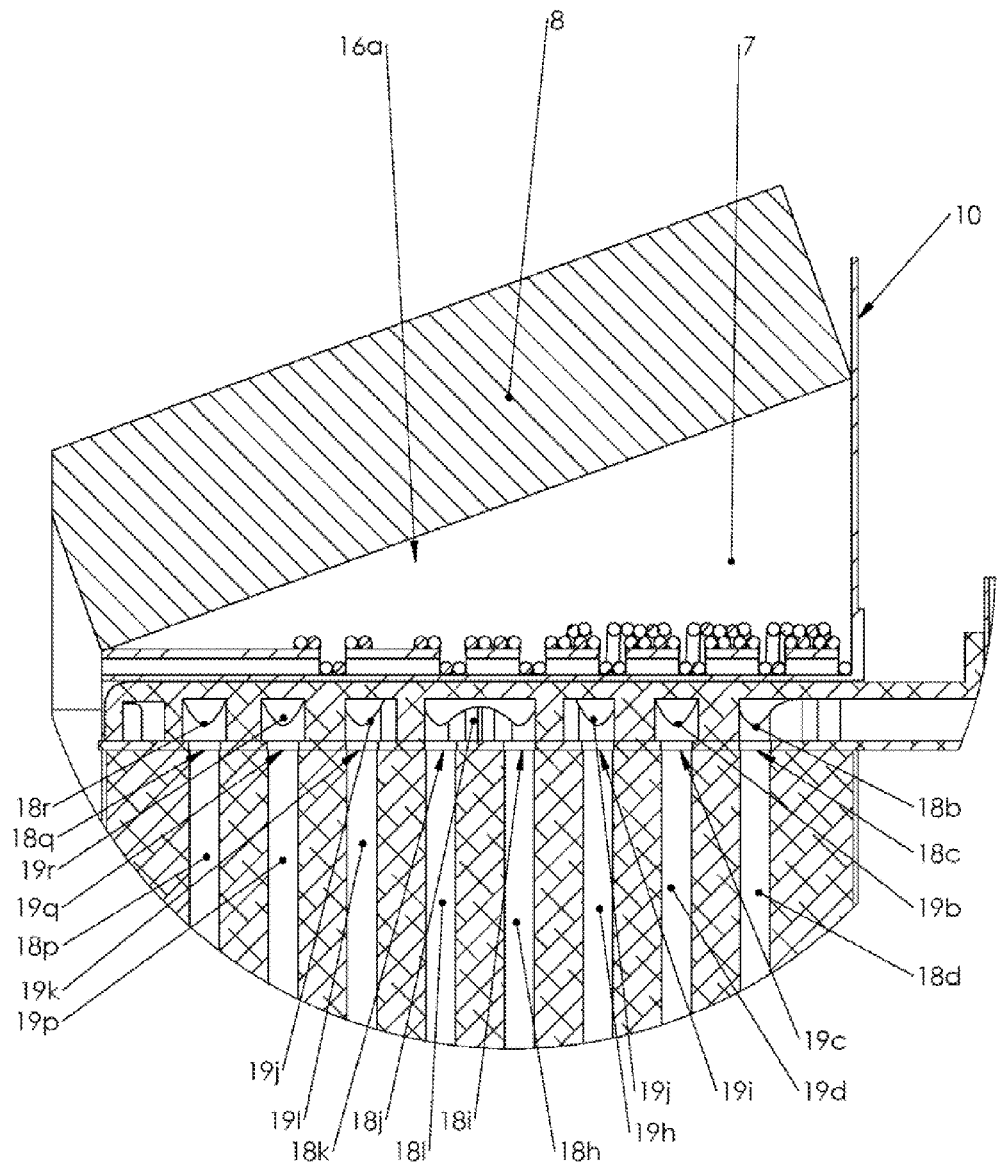
FIG. 7 is a detail of the cross sectional view shown in FIG. 5.
Figure 9:
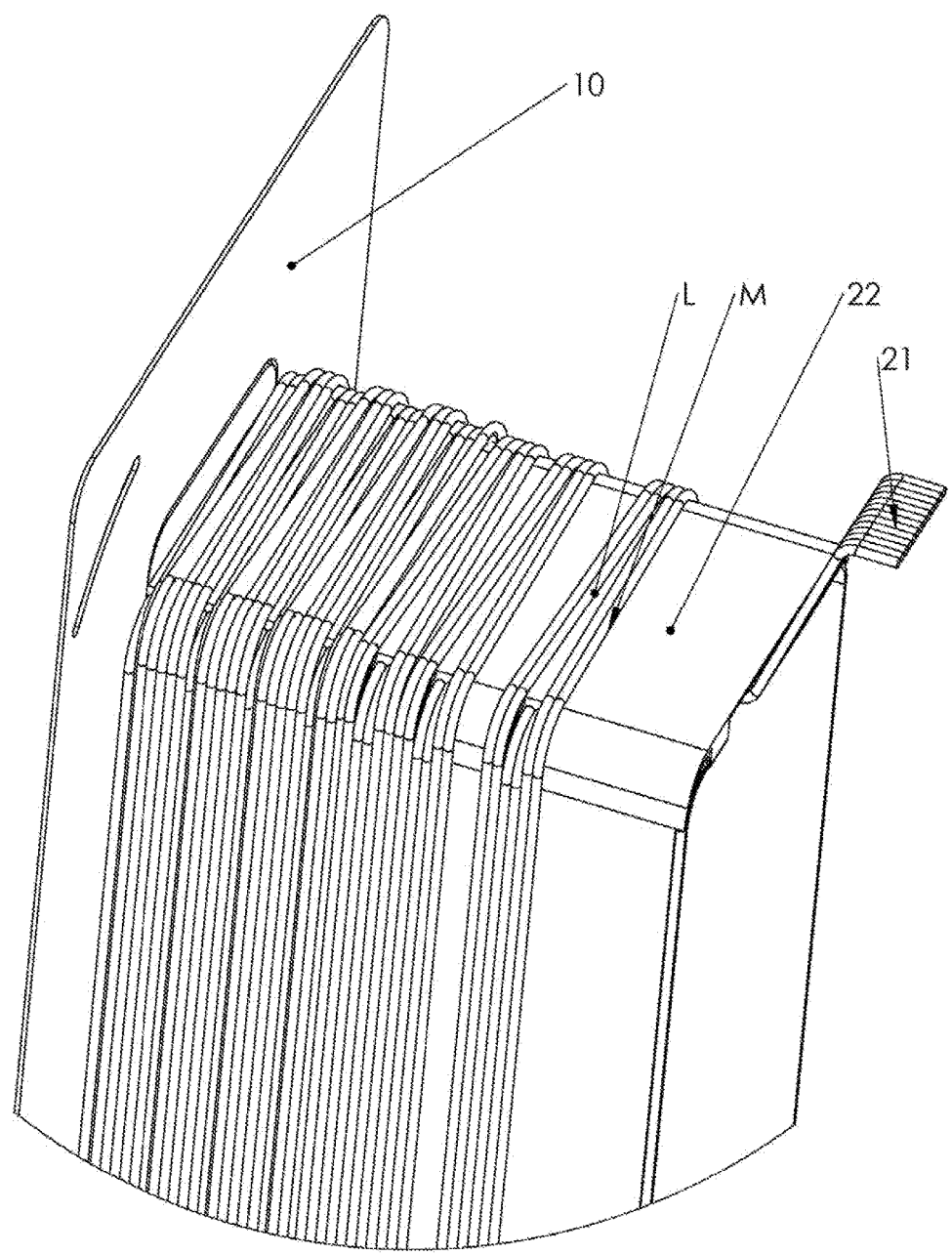
FIG. 9 shows a view of the bobbin with the first few windings installed.

The inner coil is preferably wound around a bobbin 10 as shown in FIG. 7 and FIG. 9. The bobbin acts as a slot liner to give primary insulation between coil and the grounded stator laminations and cooling manifolds. Due to the higher heat fluxes generated with more compact machines of this type, the thermal conductivity of this is very critical. This can be accomplished by some combination of making it thin and using high thermal conductivity material. It is desired to have at least a thermal conductivity of 1 W/mK and preferably a conductivity of 10 W/mK. Since this material also needs to be an electrical insulator to act as primary insulation, metals typically do not work. To function as primary insulation, electrical resistivity needs to be greater than 1000 Ohm cm and preferably greater than 10^15 Ohm cm. Plastics typically have thermal conductivities less than 1 W/mK, but there are some plastics such as those made by Coolpoly in Rhode Island USA that achieve this combination of properties. Materials such as Liquid Crystal Polymer (LCP) and Polyphenylene Sulfide (PPS) make good choices due to their heat stability but need to have special fillers to achieve high thermal conductivity.

Figure 10:
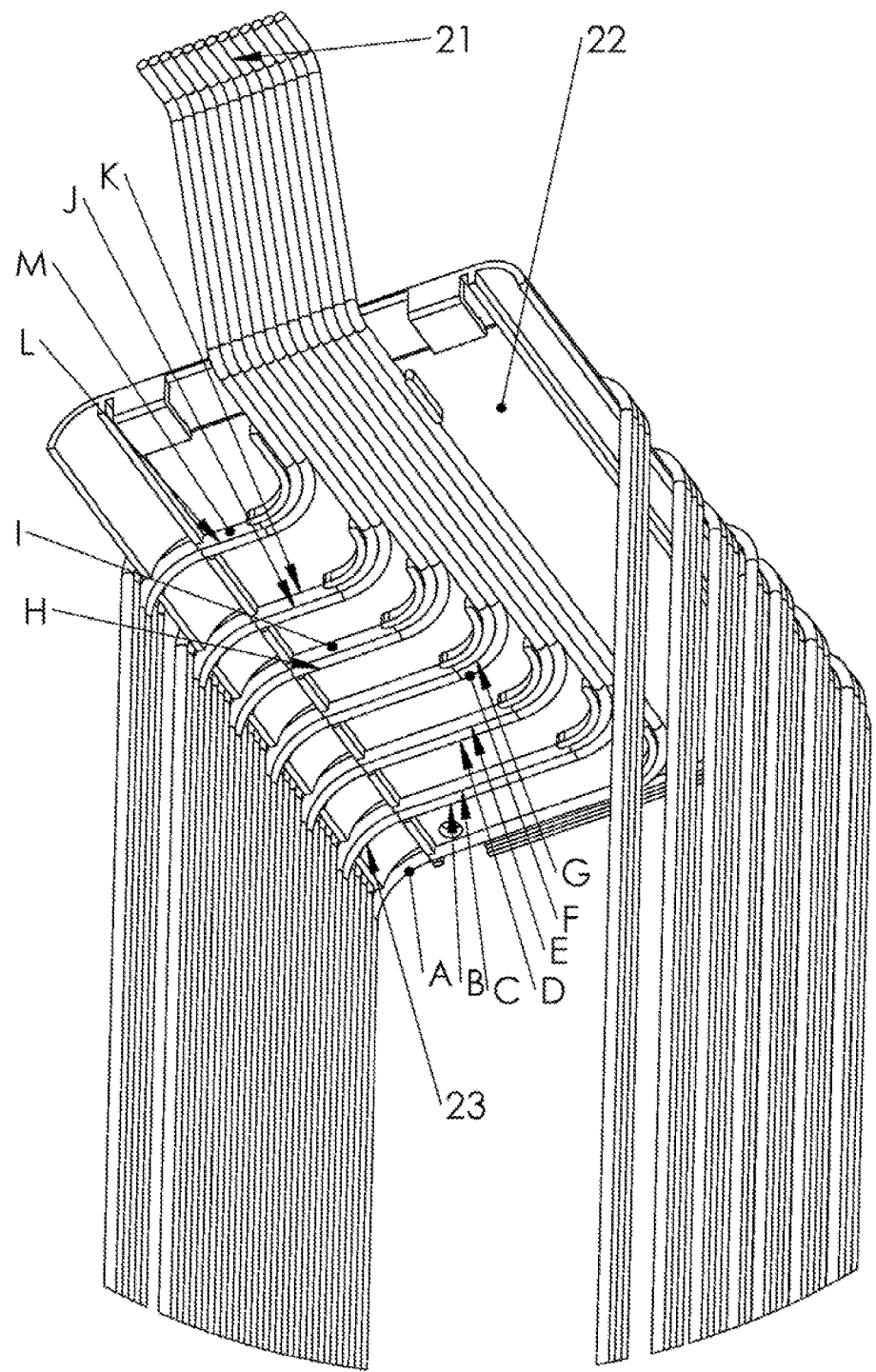
FIG. 10 shows a view of winding start cover with the first few windings installed and bobbin hidden.

With accurate placement of wires, it is very important to start the coil properly. If you are using a bobbin 10 as shown in FIG. 9, a preferable approach to start the wires is to place a cover 22 over pigtails 21 to align the wires in the correct starting position and to form a rigid or semi-rigid cover for the $2^{nd}$ wrap of wire to go over. This cover can neatly route the pigtails as shown in FIG. 10 to give the correct starting position for each wire. It is preferable to have slots or recesses 23 in the edge of the cover 22 to give maximum guiding of the $2^{nd}$ wire layer.

Figure 11:
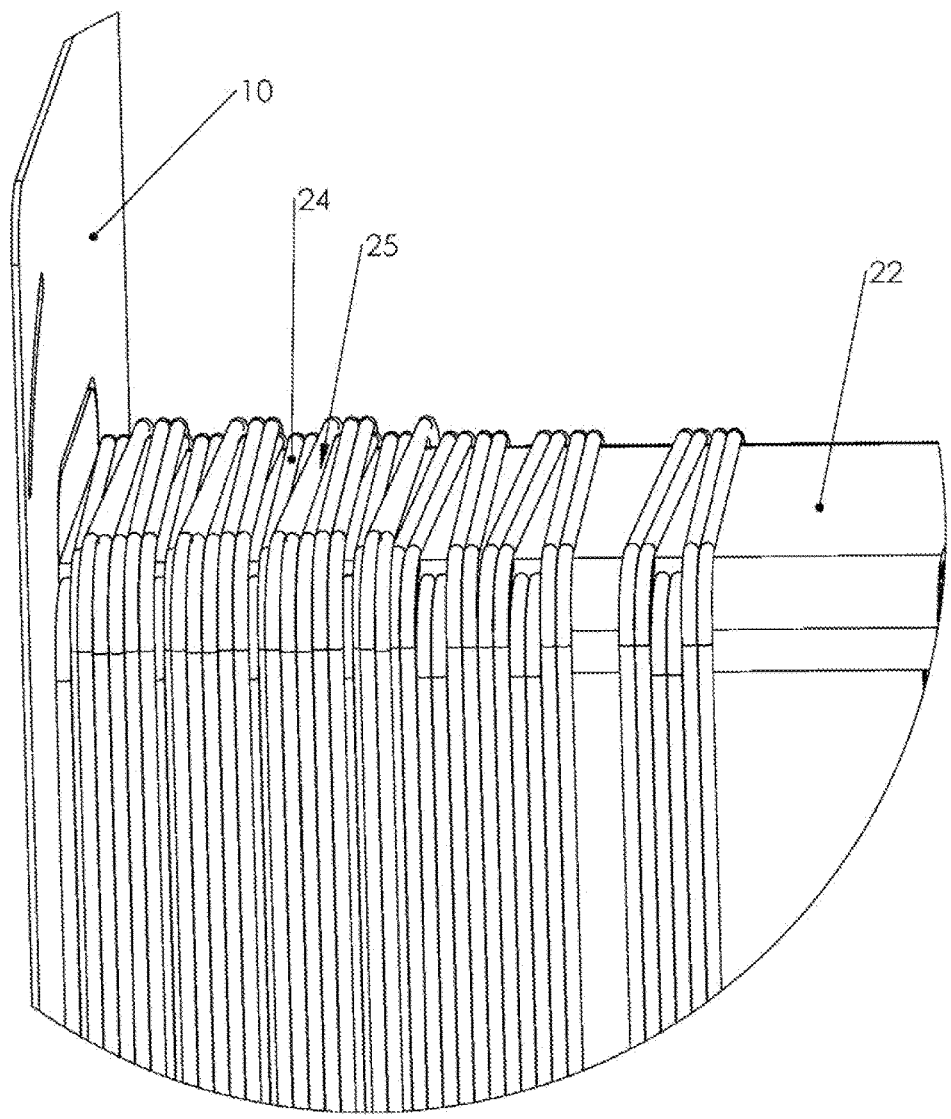
FIG. 11 shows a detail of the manifold end of the coils with just the first few wraps shown.

When you are layer winding it is preferable to have the exact nested configuration on 3 sides of the windings with 2 of these sides being the ones that go through the slot. When you go back and forth with winding, one side has to get a bit jumbled as shown in FIG. 11. The first layer has wires angled 24 and the second layer has wires angled 25 in reverse. It is desirable to do this on only one end on either end turn. This minimizes the volume of wire and maximized thermal conductivity. The combination of this type of winding with careful attention to wire voltage separation is called "layer form winding."

The invention claimed is:

1. A rotary electric machine comprising:
   a stator extending along an axis and having a circumferentially spaced series of axially extending teeth defining a similar series of circumferentially spaced winding slots therebetween, the teeth extending radially inward towards the axis, each winding slot having a length extending parallel to the axis,
   a plurality of stator windings at least partially disposed in each winding slot, and
   metallic structure defining a plurality of elongated coolant passageways positioned entirely within each winding slot between and in general engagement with surfaces of the stator windings, each of the passageways having a length extending parallel to the axis of the stator along the entire length of the winding slots, wherein the metallic structures associated with each tooth have first axial ends electrically connected together by a manifold fluidly connecting the metallic structures and second axial ends electrically isolated from one another such that coolant flows along only three sides of each tooth.

2. A rotary electric machine as set forth in claim 1 and further including a series of connecting passageways communicating with the coolant passageways and serving to directly interconnect the coolant passageways to provide coolant loops for the flow of coolant in opposite directions within the winding slot to and from the manifold, wherein an end of every coolant passageway in the structure extends into the manifold for interconnecting the coolant passageways at one end and supplying at least partially electrically conductive coolant to the coolant passageways.

3. A rotary electric machine as set forth in claim 1 wherein the coolant is a mixture of ethylene glycol and water.

4. A rotary electric machine as set forth in claim 1 wherein dual parallel coolant loops are provided for each winding slot, and wherein independent manifold and coolant supply sources are provided for the coolant loops.

5. A rotary electric machine as set forth in claim 1 wherein the metallic structure defining the plurality of elongated coolant passageways is at least in part aluminum.

6. A rotary electric machine as set forth in claim 1 wherein the metallic structure defining the plurality of elongated coolant passageways is soldered.

7. A rotary electric machine as set forth in claim 1 wherein the metallic structure defining the plurality of elongated coolant passageways is brazed.

8. A rotary electric machine as set forth in claim 7 wherein brazing filler material is added in sheet form.

9. A rotary electric machine as set forth in claim 7 wherein brazing filler material is added in paste form.

10. A rotary electric machine as set forth in claim 1 wherein the metallic structure defining the plurality of elongated coolant passageways is at least in part extruded aluminum.

11. A rotary electric machine as set forth in claim 1 wherein casting is employed in making at least some of the coolant passageways.

12. A rotary electric machine as set forth in claim 1 wherein the stator windings are of a concentrated type.

13. A rotary electric machine as set forth in claim 1 wherein each stator winding is provided in two distinct sections.

14. A rotary electric machine as set forth in claim 1 further comprising a rotor positioned within and rotatable relative to the stator, wherein the rotor is a tab pole type rotor.

15. A rotary electric machine as set forth in claim 1 wherein the metallic structure defining the plurality of elongated coolant passageways and the stator windings are spaced apart from one another by gaps, the gaps being filled with a molded thermal plastic material which is both electrically insulating and thermally conductive.

16. A rotary electrical machine as set forth in claim 15 wherein the gaps are filled with a compound including Polyphenylene Sulfide.

17. A rotary electric machine as set forth in claim 15 wherein the gaps are filled with a compound including Liquid Crystal Polymer.

18. A rotary electrical machine as set forth in claim 15 wherein the molded thermal plastic material has an electrical resistivity greater than 1000 Ohm cm.

19. A rotary electrical machine as set forth in claim 15 wherein the molded thermal plastic material has a thermal conductivity greater than 1 W/mK.

20. A rotary electric machine as set forth in claim 1 further comprising a manifold for interconnecting the plurality of elongated coolant passageways at a first end and connecting passages for interconnecting the plurality of elongated coolant passageways at a second end to form a plurality of coolant loops for each winding slot that overlap one another within each winding slot in a radial direction of the stator, the manifold supplying at least partially electrically conductive coolant to at least one of the coolant loops.

21. A rotary electric machine as set forth in claim 20 wherein the coolant loops are fluidly isolated from one another.

22. A rotary electric machine as set forth in claim 20, wherein portions of one of the coolant loops extend between portions of another of the coolant loops.

23. A rotary electric machine as set forth in claim 1 further comprising first and second manifolds positioned at opposite ends of the stator for interconnecting the plurality of elongated coolant passageways, each elongated coolant passageway extending parallel to the axis of the stator from the first manifold to the second manifold.

24. A rotary electric machine as set forth in claim 1, wherein the first axial ends of the metallic structures associated with each tooth are fluidly connected to one another and the second axial ends are fluidly isolated from one another.

25. A rotary electric machine as set forth in claim 1, wherein each tooth has a rectangular shape.

26. A rotary electric machine as set forth in claim 1, wherein the manifold is axially spaced from the stator.

27. A rotary electric machine as set forth in claim 1, wherein the manifold is axially aligned with an axial end surface of the teeth.

28. A rotary electric machine as set forth in claim 1, wherein each tooth has first and second sides at opposite axial ends of the tooth and lateral sides extending between the first and second sides.

29. A rotary electric machine comprising:
a stator extending along an axis and having a circumferentially spaced series of axially extending teeth defining a similar series of circumferentially spaced winding slots therebetween, the teeth extending radially inward towards the axis and having a length extending parallel to the axis,
a plurality of stator windings at least partially disposed in each winding slot,
structure defining a plurality of elongated coolant passageways disposed in each winding slot between and in general engagement with surfaces of the stator windings, each of the elongated coolant passageways having a length extending parallel to the axis of the stator along the entire length of the teeth, and
first and second manifolds positioned at opposite ends of the stator for interconnecting the elongated coolant passageways, each elongated coolant passageway extending from the first manifold to the second manifold to provide bidirectional coolant flow between the manifolds, wherein the first manifold is positioned between adjacent teeth and fluidly connects only coolant passageways in the same winding slot such that coolant flows along only three of the sides of each tooth.

30. A rotary electric machine as set forth in claim 29, wherein the elongated coolant passageways are spaced entirely from the stator windings.

31. A rotary electric machine as set forth in claim 29, wherein each tooth has first and second sides at opposite axial ends of the tooth and lateral sides extending between the first and second sides.

32. A rotary electric machine comprising:
a stator extending along an axis and having a circumferentially spaced series of axially extending teeth defining a similar series of circumferentially spaced winding slots therebetween, the teeth extending radially inward towards the axis, each winding slot having a length extending parallel to the axis, each tooth having first and second sides at opposite axial ends of the tooth and lateral sides extending between the first and second sides, a plurality of stator windings at least partially disposed in each winding slot, and metallic structure defining a plurality of elongated coolant passageways positioned entirely within each winding slot between the stator windings, each of the elongated coolant passageways having a length extending parallel to the axis of the stator along the entire length of the winding slots, wherein the metallic structures associated with each tooth have first axial ends electrically connected together by a manifold fluidly connecting the metallic structures and second axial ends electrically isolated from one another such that coolant flows along only three of the sides of each tooth.

* * * * *